US012594917B2

(12) United States Patent
van Thiel

(10) Patent No.: US 12,594,917 B2
(45) Date of Patent: Apr. 7, 2026

(54) FAILSAFE VALVE UNIT, ELECTRONICALLY CONTROLLABLE PNEUMATIC BRAKE SYSTEM, VEHICLE, AND METHOD

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 399 days.

(21) Appl. No.: 18/304,096

(22) Filed: Apr. 20, 2023

(65) Prior Publication Data

US 2023/0256947 A1 Aug. 17, 2023

Related U.S. Application Data

(63) Continuation of application No. PCT/EP2021/081452, filed on Nov. 12, 2021.

(30) Foreign Application Priority Data

Nov. 17, 2020 (DE) ...................... 10 2020 130 276.2

(51) Int. Cl.
*B60T 8/94* (2006.01)
*B60T 8/88* (2006.01)
(Continued)

(52) U.S. Cl.
CPC ................ *B60T 8/94* (2013.01); *B60T 8/885* (2013.01); *B60T 13/683* (2013.01); *B60T 17/22* (2013.01);
(Continued)

(58) Field of Classification Search
CPC .......... B60T 8/94; B60T 8/885; B60T 8/1708; B60T 13/662; B60T 13/683;
(Continued)

(56) References Cited

U.S. PATENT DOCUMENTS

2004/0012249 A1* 1/2004 Koelzer ................. B60T 8/323
303/3
2007/0170774 A1* 7/2007 Gerum .................... B60T 13/66
188/140 R
(Continued)

FOREIGN PATENT DOCUMENTS

DE 10 2014 107 218 A1 11/2015
DE 10 2016 005 318 A1 11/2017
(Continued)

OTHER PUBLICATIONS

International Search Report of the European Patent Office dated Feb. 10, 2022 for international application PCT/EP2021/081452 on which this application is based.
(Continued)

*Primary Examiner* — Robert A. Siconolfi
*Assistant Examiner* — San M Aung
(74) *Attorney, Agent, or Firm* — Walter Ottesen, P.A.

(57) ABSTRACT

A fail-safety valve unit of an electronically controllable pneumatic brake system for a vehicle is disclosed. The unit includes a main port for providing a first pressure, a failsafe brake port, and a failsafe brake valve. The brake valve is controllable by a control unit. The brake valve pneumatically connects the main port and the failsafe brake port when in an open position to output a failsafe brake pressure at the failsafe brake port. In the event of a fault, an electrical failure, and/or a diagnostic event of the control unit, the brake valve is in the open position and a failsafe braking operation of the vehicle is initiated through a failsafe brake pressure at the failsafe brake port by the brake system. The main port is pneumatically connected to a parking brake function to receive an output parking brake pressure or a pressure derived therefrom, as the first pressure.

26 Claims, 5 Drawing Sheets

(51) Int. Cl.
    *B60T 13/68*          (2006.01)
    *B60T 17/22*          (2006.01)

(52) U.S. Cl.
    CPC ... *B60T 2270/402* (2013.01); *B60T 2270/403* (2013.01); *B60T 2270/406* (2013.01); *B60T 2270/413* (2013.01); *B60T 2270/414* (2013.01)

(58) Field of Classification Search
    CPC ......... B60T 2270/402; B60T 2270/403; B60T 2270/404; B60T 2270/406; B60T 2270/413; B60T 2270/414; B60T 7/02; B60T 7/04; B60T 7/042; B60T 7/12; B60T 13/686; B60T 13/66; B60T 13/68; B60T 13/70; B60T 13/74
    USPC .......................................................... 303/14
    See application file for complete search history.

(56)                References Cited

U.S. PATENT DOCUMENTS

| | | | |
|---|---|---|---|
| 2017/0066420 | A1 | 3/2017 | Leinung et al. |
| 2019/0152459 | A1 | 5/2019 | Dieckmann et al. |
| 2019/0193705 | A1 | 6/2019 | Wulf |
| 2019/0248349 | A1 | 8/2019 | Wulf |
| 2019/0248351 | A1 | 8/2019 | Wulf |
| 2020/0023827 | A1* | 1/2020 | Van Thiel ............... B60T 13/74 |
| 2020/0148180 | A1* | 5/2020 | Van Thiel ............ B60T 13/263 |
| 2022/0089137 | A1 | 3/2022 | Michaelsen et al. |
| 2022/0274573 | A1 | 9/2022 | Otremba et al. |
| 2022/0289159 | A1 | 9/2022 | Van Thiel |

FOREIGN PATENT DOCUMENTS

| | | |
|---|---|---|
| DE | 10 2016 010 460 A1 | 3/2018 |
| DE | 10 2016 010 462 A1 | 3/2018 |
| DE | 10 2016 010 464 A1 | 3/2018 |
| DE | 10 2017 002 718 A1 | 9/2018 |
| DE | 10 2019 106 274 A1 | 9/2020 |
| DE | 10 2019 131 930 A1 | 5/2021 |
| EP | 2 055 541 A1 | 5/2009 |
| WO | 2021/099307 A1 | 5/2021 |
| WO | 2021/104939 A1 | 6/2021 |

OTHER PUBLICATIONS

English translation of the Written Opinion of the International Searching Authority dated Feb. 10, 2022 for international application PCT/EP2021/081452 on which this application is based.

* cited by examiner

FAILSAFE VALVE UNIT, ELECTRONICALLY CONTROLLABLE PNEUMATIC BRAKE SYSTEM, VEHICLE, AND METHOD

CROSS-REFERENCE TO RELATED APPLICATIONS

This application is a continuation application of international patent application PCT/EP2021/081452, filed Nov. 12, 2021, designating the United States and claiming priority from German application 10 2020 130 276.2, filed Nov. 17, 2020, and the entire content of both applications is incorporated herein by reference.

TECHNICAL FIELD

The disclosure relates to a fail-safety valve unit. The disclosure also relates to an electronically controllable pneumatic brake system having a fail-safety valve unit. The disclosure also relates to a vehicle having an electronically controllable pneumatic brake system. The disclosure also relates to a method for operating a brake system.

BACKGROUND

In modern electronically controllable pneumatic brake systems, which are used in particular in utility vehicles that are intended for autonomous driving operation, it is important to provide measures which allow the utility vehicle to be safely decelerated even in the event of a fault in the brake system.

In particular, the provision of redundancies is a proven measure for increasing safety. Approaches here include using fully redundant brake systems, partially redundant brake systems or merely different levels in one brake system, such that, if a fault occurs in a first level, the brake system can continue to be operated, at least with limitations, in a second level.

One approach is to provide a function for failsafe braking in the event of a fault by activating the parking brake. A problem here is the time delay with which the failsafe braking operation occurs, which is attributable to a dead time in the response behavior owing to the inverse chain of events—in relation to a service brake—including the pressure offset that must be overcome in order to engage the parking brake.

There are therefore advantageously approaches which are based on the outputting of a brake pressure to the service brake in the event of a fault.

A system that provides an electronically pneumatically controlled redundancy is disclosed in DE 10 2016 005 318 A1. The system disclosed in the document utilizes a bypass valve to transmit control pressures in a manner dependent on a failure of a subsystem, in order to thus provide at least a pneumatic supply to the respective circuit that has electrically failed. This, too, has the generally advantageous effect of increasing the residual availability. Similar systems are disclosed in DE 10 2016 010 462 A1 and in DE 10 2016 010464A1.

The concept still has potential for improvement, in particular with regard to reliable provision of a failsafe braking operation in a fault event and sustained assurance of the braked state.

It is therefore desirable to improve the function of the fail-safety valve unit.

SUMMARY

It is an object of the disclosure to specify an improved fail-safety valve unit. In particular, it is sought to provide a fail-safety valve unit which, in a fault event, reliably provides a failsafe braking operation and sustainedly ensures the braked state of the vehicle.

The disclosure proceeds from a fail-safety valve unit for a failsafe brake function of an electronically controllable pneumatic brake system for a vehicle, in particular a utility vehicle, wherein the brake system has a control unit, and the fail-safety valve unit has: a main port, which provides a first pressure, and a failsafe brake port, a failsafe brake valve which is configured as a monostable valve and which is controllable by the control unit or by an external control unit and which is configured to pneumatically connect the main port and the failsafe brake port when in an open position in order to output a failsafe brake pressure at the failsafe brake port.

According to the disclosure, in the case of the fail-safety valve unit according to the first aspect of the disclosure, provision is made whereby, in a fault event and/or in the event of an electrical failure and/or in a diagnostic event of the control unit, the failsafe brake valve is in the open position, and whereby a failsafe braking operation of the vehicle is initiated through the provision of the failsafe brake pressure at the failsafe brake port by the brake system, wherein the main port is pneumatically connected to a parking brake function in order to receive an output parking brake pressure, or a pressure derived therefrom, as first pressure.

The electronically controllable pneumatic brake system has, in particular, a service brake system and a parking brake system. The parking brake function is configured to pneumatically actuate at least one parking brake cylinder.

Aspects of the disclosure are based on the notion of using a separate actuation branch to maintain the ability of a brake system, in particular a service brake system of the brake system, to be actuated—for the purposes of initiating a failsafe braking operation in a fault event. In particular, through the provision of a failsafe brake pressure in the fault event, it is sought to ensure reliable deceleration of the vehicle by way of a failsafe braking operation.

The disclosure encompasses the knowledge that sustainedly maintaining the braked state of the vehicle is important for the safety of the vehicle. After a failsafe braking operation via the fail-safety valve unit, a leak can occur in the service brake circuit that performs the failsafe braking operation, in particular in a control line of the pneumatic front-axle brake circuit, or at a front-axle modulator or at some other location in a separate actuation branch in which the fail-safety valve unit is arranged. In the event of such a leak, if the connected pressure reservoir is progressively emptied, a decrease in the failsafe brake pressure, and thus a diminishment of the effect of the failsafe braking operation, can occur.

By virtue of the fact that, according to the disclosure, the main port is pneumatically connected to a parking brake function in order to receive an output parking brake pressure as first pressure, it is advantageously achieved that, if a leak occurs after a failsafe braking operation via the fail-safety valve unit, the at least one parking brake cylinder is likewise pneumatically connected to the leaking part. Owing to the fail-safety valve unit according to the disclosure, a leak thus has the effect that the parking brake is engaged, and thus the braked state of the vehicle is reliably maintained. The parking brake is engaged by ventilation of the parking brake cylinder and by the action of a pressure spring, which relaxes in the process, on a wheel brake.

Via the fail-safety valve unit according to the disclosure, the pneumatic connection of a service brake circuit that performs the failsafe braking operation, in particular a front-axle brake circuit of the service brake, to the output parking brake pressure is thus utilized in targeted fashion in order, in the event of a pressure loss, to compensate for the diminishing action of the service brake circuit, which performs the failsafe braking operation, by way of the incipient action of the parking brake. This process may in particular take place relatively slowly, in particular over several hours or even days, in particular depending on the size of the leak.

In particular, the parking brake system and/or the parking brake function includes a parking brake module. The parking brake function can preferably be configured to output a parking brake pressure in order to pressurize parking brake cylinders. The parking brake function can preferably be provided by a parking brake module. In embodiments, the parking brake function may be provided by some other pneumatic or electropneumatic device, for example an axle modulator, a trailer control module or similar pneumatic or electropneumatic device.

In particular, the main port is pneumatically connected to a parking brake cylinder, preferably to two parking brake cylinders arranged on respective sides of the vehicle. In particular, the main port is pneumatically connected to at least one parking brake chamber of the parking brake cylinder.

Various embodiments of the disclosure include a selector valve with a first port, which is pneumatically connected to the parking brake function, in particular to a parking brake system and/or the parking brake module, in order to receive the first pressure, with a second port, which is pneumatically connected to a further compressed-air reservoir in order to receive a further reservoir pressure as second pressure, and with a third port, which is pneumatically connected to the failsafe brake valve, wherein the selector valve is configured to pneumatically connect that one of the first and second ports at which the higher pressure prevails to the third port, and in particular to shut off the respective other port.

An embodiment with a selector valve encompasses the knowledge that a redundant supply of compressed air to the fail-safety valve unit advantageously increases the safety of the vehicle. Via a selector valve with a first port that is pneumatically connected to a parking brake system in order to receive the first pressure, a first compressed-air source can advantageously be made available to provide a failsafe brake pressure, which first compressed-air source is in particular independent of the compressed-air source, used during normal operation, of the brake circuit, in particular of a service brake circuit, to which the failsafe brake pressure is provided. A redundancy is thus already advantageously achieved through the use of a separate brake circuit.

Via a second port of the selector valve, which is pneumatically connected to a further compressed-air reservoir in order to receive a further reservoir pressure as a second pressure, a yet further compressed-air source that is independent of the parking brake system is provided as a yet further redundancy. Here, the further compressed-air reservoir may in particular also be a compressed-air reservoir of the service brake system.

By virtue of the fact that the failsafe brake valve has a third port that is pneumatically connected to the failsafe brake valve, and the failsafe brake valve is configured to pneumatically connect that one of the first and second ports at which the higher pressure prevails to the third port, it is advantageously the case even in the event of a failure of one compressed-air source at one of the first and second ports that the other, available compressed-air source is automatically connected to the failsafe brake valve.

The availability of the failsafe brake function, and thus the safety of the vehicle, are thus advantageously yet further increased via the selector valve.

In particular, the failsafe brake valve is configured to be in the open position when in the non-actuated, in particular electrically deenergized state. In particular, the failsafe brake valve is of monostable configuration.

The selector valve can preferably be configured as a shuttle valve, particularly preferably as a select-high shuttle valve.

The parking brake pressure is in particular output or provided by a parking brake module. The parking brake circuit reservoir pressure is in particular provided by a compressed-air reservoir of the parking brake system. If the parking brake circuit reservoir pressure is provided by a compressed-air reservoir of the parking brake system, the parking brake system, in particular the parking brake module, is advantageously configured to automatically engage when in an electrically passive state in the absence of reservoir pressure. An electrically passive state exists in particular when the control unit and/or a further control unit and/or the parking brake module are not supplied with electrical current, or have failed owing to a fault event.

Provision can preferably be made for the failsafe brake pressure to be provided as control pressure for an axle modulator, in particular for a front-axle modulator, or for the failsafe brake pressure to be provided as brake pressure for a brake cylinder. If the failsafe brake pressure is provided as brake pressure for a brake cylinder, the compressed air required for the failsafe braking operation can advantageously be fully supplied via the fail-safety valve unit if, in particular, the brake cylinder is activated entirely by way of the compressed air that is provided, at the failsafe brake pressure, by the fail-safety valve unit. If the failsafe brake pressure is provided as brake pressure for a modulator, the failsafe brake pressure acts in particular on a control port of the modulator, wherein the modulator in particular has the effect of boosting the air flow rate, and a supply is provided to the modulator in particular from a further compressed-air source or compressed-air reservoir. The control port of the modulator is in particular a redundancy port of the modulator.

A further failsafe brake valve can preferably be provided which is connected pneumatically in series with the failsafe brake valve and which is controllable by a control unit, in particular a further control unit. The further failsafe brake valve, when in the non-actuated, in particular electrically deenergized state, is preferably open in an open position such that the first pressure prevailing at the main port is provided as failsafe brake pressure at the failsafe brake port. In particular, the further failsafe brake valve is controllable by way of a further control signal. The control unit is in particular assigned to a primary system. In particular, the further control unit and/or the further failsafe brake valve is assigned to a first fall-back level. In embodiments with a further control unit, a failsafe braking operation can advantageously be ensured via a further failsafe brake valve even in the presence of a double fault, that is, if both the control unit and the further control unit have a fault. A fault event may arise in particular as a result of an exceptional fault and/or an electrical failure. The further failsafe brake valve is in particular of monostable configuration. The failsafe brake valve and/or the further failsafe brake valve are in particular arranged in a valve main line.

Various embodiments of the disclosure are refined by the fact that the failsafe brake valve and/or the further failsafe brake valve is configured as a 2/2 directional valve, in particular as a 2/2 directional solenoid valve. The output failsafe brake pressure can advantageously be modulated via a further failsafe brake valve configured as a 2/2 directional valve, in particular by way of timed opening and closing of the 2/2 directional valve. In particular, it is possible to ensure staged braking in the event of partial failures or in the case of residual availability of the control unit, for example if a voltage supply is still available. By modulating the failsafe brake pressure, it is possible in particular to achieve a less abrupt failsafe braking operation.

Provision can preferably be made whereby the failsafe brake valve and/or the further failsafe brake valve is configured as a 3/2 directional valve, in particular as a 3/2 directional solenoid valve. In particular, the failsafe brake valve and the further failsafe brake valve are structurally identical. In particular, the failsafe brake valve and/or the further failsafe brake valve has a ventilation port which is pneumatically connected to the failsafe brake port when the failsafe brake valve or the further failsafe brake valve is in a shut-off position. In this way, ventilation of the failsafe brake port is made possible in the shut-off position.

A pressure-limiting valve can preferably be provided. A predefined failsafe brake pressure can advantageously be set via a pressure-limiting valve in order to achieve a suitable braking power during a failsafe braking operation. A pressure-limiting valve is preferably arranged at the main port of the fail-safety valve or between the main port and the first valve that follows the fail-safety valve unit.

A bistable valve can preferably be provided, which is configured for switching between a first, deactivation position, which shuts off the valve main line or connects same to a vent, and a second, activation position, which connects the valve main line, wherein the bistable valve is connected pneumatically in series with the at least one failsafe brake valve. Via a bistable valve, the fail-safety valve unit can advantageously be operated both in a mode that is suitable for automatic operation of the vehicle and in a mode that is suitable for manual operation of the vehicle. In particular, the bistable valve is configured such that, in the first position, which shuts off the valve main line, the valve main line is pneumatically connected at a first bistable valve port to a vent of the bistable valve, and at the same time the valve main line is shut off at a second bistable valve port, and in a second position, which pneumatically connects the valve main line, the valve main line is pneumatically connected between the first and second bistable valve ports, and at the same time the vent of the bistable valve is shut off. The bistable valve is preferably arranged in a valve main line.

When the bistable valve is in a first position, which shuts off the valve main line, the provision of a failsafe brake pressure at the failsafe brake port of the fail-safety valve unit is prevented per se, irrespective of the position of the failsafe brake valves. Therefore, in this first position, a failsafe braking operation that would be caused by a double fault is prevented. This may be advantageous in particular during manual operation of the vehicle, in particular if it is intended for a human driver to retain overall control over the vehicle. By contrast, the bistable valve can be switched into a second position, which pneumatically connects the valve main line, in order that, when the at least one failsafe brake valve of the fail-safety valve unit is in an open position, the failsafe brake pressure can be provided at the failsafe brake port in order to initiate a failsafe braking operation of the vehicle. In accordance with the concept of a bistable valve, this remains in a switched position specifically even when electrically deenergized, and in particular irrespective of any faults in the brake system. The bistable valve is in particular controlled via the control unit or a valve control unit. The valve control unit is connected in a signal-conducting and/or energy-conducting manner in particular to the control unit of the brake system and/or to a vehicle bus.

A further selector valve can preferably be provided, with a first further port, which is pneumatically connected, in order to receive a brake signal transmitter pressure, to a brake signal transmitter, in particular to a pneumatic front-axle modulator control line, with a second further port, which is pneumatically connected, in order to receive the failsafe brake pressure, to the failsafe brake port, and with a third further port, which is pneumatically connected to a service brake cylinder or to an axle modulator, wherein the further selector valve is configured to pneumatically connect that one of the first and second further ports at which the higher pressure prevails to the third further port, and in particular to shut off the respective other port. Via a further selector valve, the failsafe brake pressure can advantageously be input into the service brake circuit additionally to the brake signal transmitter.

A pressure sensor is preferably provided which is arranged at the failsafe brake port 22 or is pneumatically connected thereto. Via a pressure sensor, the pressure reaction and thus the functioning of the fail-safety valve unit can be checked for plausibility and/or inspected.

A failsafe relay valve can preferably be provided. The failsafe relay valve is in particular arranged between the at least one failsafe brake valve, and any bistable valve, at one side, and the failsafe brake port at the other side. A failsafe relay valve can advantageously have the effect of boosting an air flow rate, whereby the other valves of the fail-safety valve unit can advantageously be configured with smaller nominal diameters.

In optional embodiments, the further selector valve may be arranged at some other location in the service brake system, in particular in a pneumatic front-axle brake circuit, for the purposes of providing a direct supply to one or more service brake cylinders.

In an embodiment, an external control unit is provided, which is connected in a signal-conducting and/or energy-conducting manner to one or more of the valves of the fail-safety valve unit, in particular to the at least one failsafe brake valve. In particular, the external control unit is connected to the fail-safety valve unit via an alternative control line and/or an alternative further control line. The external control unit is in particular connected in a signal-conducting manner to the control unit, in particular via a monitoring line, in order to monitor the control unit. The external control unit may in particular advantageously be formed by another electronic control unit of the vehicle or as part of another electronic control unit of this type. Another electronic control unit of this type is in particular a virtual driver, for example in the form of an automatic operation control unit, or an electronic control unit of a steering system or of a parking brake system or of an air treatment system. The function of the control unit, that is, of the control unit of the brake system, in particular of the service brake system, may advantageously be monitored via an external control unit. In the event of a fault of the control unit, this is identified by the external control unit. The external control unit can, in the fault event, interrupt the actuation of the valves of the fail-safety valve unit, in particular of the at least one failsafe brake valve, and in particular initiate a failsafe braking operation.

In a second aspect, to achieve the above object, the disclosure furthermore specifies an electronically controllable pneumatic brake system for a vehicle, in particular a utility vehicle, having a control unit.

In the case of the electronically controllable pneumatic brake system, a fail-safety valve unit according to at least one of the above-described preferred embodiments of the fail-safety valve unit according to the first aspect of the disclosure is provided, wherein the fail-safety valve unit is arranged in a separate actuation branch and is pneumatically connectable via a failsafe brake port to at least one service brake cylinder and/or one service brake chamber and/or one axle modulator in order to provide a failsafe brake pressure for an axle modulator in order to initiate a failsafe braking operation of the vehicle.

The advantages of the fail-safety valve unit are advantageously utilized in the brake system. Here, a "separate actuation branch" means that the fail-safety valve unit is arranged in an additional pneumatic actuation branch that is formed separately from a primary pneumatic actuation branch, which in particular has a brake signal transmitter.

In an embodiment of the electronically controllable pneumatic brake system, an axle modulator is provided, with a throttle, in particular a dissipation bore, that pneumatically connects a part, which conducts a control pressure, of the axle modulator to a part, which conducts a working pressure, of the axle modulator. That part of the axle modulator which conducts control pressure is formed in particular by a control line of the axle modulator, in particular a relay valve of the axle modulator. That part of the axle modulator which conducts working pressure is formed in particular by a working line of the axle modulator, in particular a relay valve of the axle modulator. In particular, the throttle is provided in a relay piston of the relay valve of the axle modulator. Via such a throttle, the engagement of the parking brake can advantageously be ensured even in the event of a leak in a working line or in a part that is pneumatically connected to the working line.

In an embodiment of the electronically controllable pneumatic brake system, provision is made whereby the control unit is assigned to a primary system of the electronically controllable pneumatic brake system, and the electronically controllable pneumatic brake system furthermore has: a further control unit for a first fall-back level, wherein the failsafe brake valve is actuatable by the control unit, and the further failsafe brake valve is actuatable by the further control unit, and the first control unit and the second control unit are supplied with energy independently of one another, and/or can at least partially replace one another in terms of their function.

In a third aspect, to achieve the above object, the disclosure furthermore specifies a vehicle, in particular utility vehicle, having a brake system according to the concept of the disclosure. The advantages of the fail-safety valve unit are advantageously utilized in the vehicle. In an embodiment of the vehicle, an external control unit is provided.

In a fourth aspect, to achieve the above object, the disclosure furthermore specifies a method for operating a brake system with a fail-safety valve unit for a failsafe brake function of an electronically controllable pneumatic brake system, in particular according to the second aspect of the disclosure, for a vehicle or a utility vehicle, in particular according to the third aspect of the disclosure, wherein the fail-safety valve unit is preferably configured according to any one of the above-described embodiments of the fail-safety valve unit according to the first aspect of the disclosure.

In the method according to the fourth aspect of the disclosure, the following steps are provided:

providing a signal for locking out a failsafe brake pressure, which takes effect for a failsafe braking operation, via a control unit, interrupting the provision of the signal in a fault event and/or in the event of an electrical failure and/or in a diagnostic event of the control unit and thus automatically ending the lock-out of the failsafe brake pressure in order to initiate a failsafe braking operation of the vehicle, wherein the failsafe brake pressure is a parking brake pressure, output by a parking brake function of the brake system, for pressurizing parking brake cylinders, or is a pressure derived therefrom.

The ending of the lock-out of the failsafe brake pressure preferably includes the switching of the failsafe brake valve into an open position. The signal for locking out a failsafe brake pressure, which takes effect for a failsafe braking operation, is preferably provided for a failsafe brake valve. The failsafe brake valve is preferably a monostable failsafe brake valve that opens when not actuated. The signal is preferably provided by a control unit. The signal is preferably an electrical or electronic signal. In other embodiments, it is conceivable for the signal to be some other signal, for example a pneumatic signal. The interruption of the provision of the signal is preferably caused by the fault event and/or electrical failure of the control unit.

The automatic ending of the lock-out of the failsafe brake pressure preferably includes automatic switching of the failsafe brake valve into its open position. The actuation of the failsafe brake valve is preferably an electrical energization of a magnet part and/or electromagnet of the failsafe brake valve. The failsafe brake valve is preferably a monostable failsafe brake valve that opens when electrically deenergized. The failsafe brake pressure is preferably provided to an axle modulator or to a service brake cylinder. The output parking brake pressure is preferably provided by a parking brake module.

In an embodiment of the method according to the fourth aspect of the disclosure, a diagnostic procedure is provided, having the step:

ascertaining the failsafe brake pressure, preferably via a pressure sensor at the failsafe brake port, wherein, before the provision of the signal is interrupted, preferably in a diagnostic event of the control unit, a demand is made for pressure to be output in the service brake system, and preferably, a braking demand is placed on an axle modulator.

Here, by contrast to the fault event and the electrical failure, the diagnostic event is an intentionally implemented state of a control unit for diagnostic purposes, in which, preferably, the state of the signal or of the signals for locking out a failsafe brake pressure, which takes effect for a failsafe braking operation, corresponds to the state in a fault event and/or in the event of an electrical failure. The provision of a signal for locking out a failsafe brake pressure, which takes effect for a failsafe braking operation, is preferably interrupted in a diagnostic event.

The output failsafe brake pressure can preferably be ascertained for the purposes of checking the correct functioning of the failsafe brake valve. The correct functioning of the failsafe brake valve preferably consists in that an interruption of the actuation of the failsafe brake valve causes a pressure reaction in the form of the outputting of the failsafe brake pressure. The pressure reaction can advantageously be checked for plausibility by way of the diagnostic procedure.

The braking demand is preferably provided by a brake signal transmitter. The braking demand is provided in particular via a vehicle data bus. Preferably, the braking demand and/or the demand for the outputting of a pressure in the service brake system is in the form of an XBR signal or similar signal of a vehicle data bus.

By virtue of the fact that the outputting of a pressure in the service brake system is demanded, in particular a braking demand is placed on an axle modulator, before the provision of the signal is interrupted, a possible plausibility error in the brake system, in particular in the control unit, is avoided. Such a plausibility error would be detected, in particular by the control unit, if a pressure were introduced into the service brake system by the fail-safety valve unit in the absence of a corresponding braking demand, such as a deflection of the brake signal transmitter, in particular of a brake pedal. The pressure that is input into the service brake system may be measured in particular via an axle modulator pressure sensor.

Correct functioning of the fail-safety valve unit can advantageously be checked or ensured by way of the diagnostic procedure. The diagnostic procedure may be initiated in various ways. Firstly, the diagnostic procedure may be carried out during a braking operation initiated by a braking demand during the operation of the vehicle. This is the case for example if an electronic braking demand is transmitted to an axle modulator by a driver using the brake signal transmitter or by the control unit in an automatic driving mode.

In particular, the outputting of pressure is electrically or electronically demanded via the control unit and via an electrical axle modulator control line, in particular an electrical front-axle modulator control line or electrical rear-axle modulator control line. In particular, the braking demand is an electrical or electronic braking demand.

The advantages of the fail-safety valve unit are advantageously utilized in the method according to the fourth aspect of the disclosure.

In a fifth aspect, to achieve the above object, the disclosure furthermore specifies a method for operating a brake system with a fail-safety valve unit for a failsafe brake function of an electronically controllable pneumatic brake system, in particular according to the second aspect of the disclosure, for a vehicle or a utility vehicle, in particular according to the third aspect of the disclosure, wherein the fail-safety valve unit is preferably configured according to any one of the above-described preferred embodiments of the fail-safety valve unit according to the first aspect of the disclosure.

In the method according to the fifth aspect of the disclosure, the following steps are provided:

providing a signal for locking out a failsafe brake pressure, which takes effect for a failsafe braking operation, via a control unit, interrupting the provision of the signal in a fault event and/or in the event of an electrical failure and/or in a diagnostic event of the control unit and thus automatically ending the lock-out of the failsafe brake pressure in order to initiate a failsafe braking operation of the vehicle, having a diagnostic procedure with the step:

ascertaining the failsafe brake pressure, preferably via a pressure sensor at the failsafe brake port, wherein, before the provision of the signal is interrupted, preferably in a diagnostic event of the control unit, a demand is made for pressure to be output in the service brake system, and preferably, a braking demand is placed on an axle modulator.

Provision is preferably made whereby the failsafe brake pressure is a parking brake pressure, output by a parking brake function, for pressurizing parking brake cylinders, or is a pressure derived therefrom.

Provision is preferably made whereby a pneumatic supply is provided to the fail-safety valve unit from a brake circuit that is independent of that brake circuit of the service brake system which performs the failsafe braking operation. A "pneumatic supply" refers to the provision of compressed air, in particular of a first pressure, which is provided as failsafe brake pressure upon the opening of the at least one failsafe brake valve.

A pneumatic supply is preferably provided to the fail-safety valve unit from a pressure reservoir that is independent of the pressure reservoir of that brake circuit of the service brake system which performs the failsafe braking operation. In particular, the failsafe brake pressure is provided from a pressure reservoir of the parking brake system or from a further pressure reservoir.

Provision is preferably made whereby the diagnostic procedure is carried out during a service braking operation of the service brake system, in particular while a braking demand is present. During a service braking operation, a braking demand is transmitted to the axle modulator that performs the braking operation. Such a braking demand is in particular electrical or electronic, and may be provided from a brake signal transmitter or a control unit, for example an external control unit and/or an automatic operation control unit. The failsafe brake pressure can advantageously be provided in this case, because a pressurization, and a correspondingly rising pressure measured via the axle modulator pressure sensor, are expected in any case. The effect of a failsafe braking operation resulting from the provision of the failsafe brake pressure would also advantageously not be noticeable, or be noticeable only to a minor extent, during a service braking operation, because braking of the vehicle is demanded in any case.

In other embodiments of the method, the diagnostic procedure is alternatively or additionally carried out while the vehicle is at a standstill, wherein, in particular, a braking demand is generated, in particular by an external control unit and/or by an automatic operation control unit. While at a standstill, an actuation of the service brake initiated by the provision of the failsafe brake pressure would not be noticeable, because the vehicle is at a standstill. However, a braking demand is advantageously generated in this case, too, in order to avoid a plausibility error in the control unit of the brake system.

Provision is preferably made whereby the braking demand is provided by a brake signal transmitter and/or by an external control unit and/or by an automatic operation control unit. The braking demand is provided in particular via a vehicle data bus. The braking demand is in particular in the form of a CAN signal, in particular in the form of an XBR signal.

In one embodiment of the method, the following steps are provided:

providing a signal for an individual valve, in particular for an individual failsafe brake valve or an individual bistable valve, ascertaining the failsafe brake pressure, in particular checking the plausibility of the pressure reaction for the individual valve. In one embodiment, the method may additionally have the step: checking the plausibility of the pressure reaction for a pressure-limiting valve.

A plausibility check includes a check as to whether an ascertained pressure value corresponds to an expected pressure value. A pressure reaction for a valve is in particular the change in pressure, or the expected change in pressure, which is associated with actuation of the valve. A plausibility check may in particular include a check as to whether no pressure prevails, that is, whether the pressure is equal to or close to zero, because the valves are intended to close (which equates to no pressurization) when actuated or when the signal is provided. In this way, the diagnosis can advantageously be differentiated, because the reaction of individual valves can be inspected. All of the valves are advantageously initially left in the non-actuated state and/or—in particular in the case of a bistable valve—in their pressurization position. In this case, the output failsafe brake pressure should be measured at the pressure sensor. If this is not the case, a fault is output. The individual valves of the fail-safety valve unit can subsequently be actuated in succession in order to check the reaction. For example, the failsafe brake valve is switched, by being actuated, into its shut-off position, whereby the measured pressure should fall. If this is not the case, it can be concluded that there is a fault relating to the failsafe brake valve, which may lie for example in the mechanism of the valve, in the magnet part, or in the control line. Such an individual check may be performed analogously for the other valves, in particular a further failsafe brake valve and/or a bistable valve.

A diagnostic procedure or a diagnostic event may advantageously be carried out automatically at regular intervals in order to check and ensure the function of the fail-safety valve unit and in particular identify dormant faults in the fail-safety valve unit early. For example, a diagnostic procedure may be carried out every time the vehicle is started, or every time the vehicle is started after a set number of starts. In particular, the diagnostic procedure may be carried out as part of a higher-level self-diagnosis of the vehicle. In particular, the diagnostic procedure may be carried out during a service braking operation after a set number of service braking operations, or during a service braking operation at set time intervals (for example once per day or once per week or once per month).

In the method according to the fifth aspect of the disclosure, it is advantageously possible, in order to check and ensure the correct functioning of the fail-safety valve unit, for a first pressure to be provided at the main port of the fail-safety valve unit, which first pressure preferably originates from a further pressure source, preferably a brake circuit or brake system, which brake circuit or brake system is independent of the brake circuit that performs the failsafe braking operation. For example, for the diagnostic procedure, an output pressure from a parking brake module or from a trailer control module or from a front-axle modulator or from a rear-axle modulator or similar axle modulator may be provided as the first pressure at the main port.

The advantages of the fail-safety valve unit are advantageously utilized in the method according to the fifth aspect of the disclosure.

It is to be understood that the fail-safety valve unit according to the first aspect of the disclosure, the electronically controllable pneumatic brake system according to the second aspect of the disclosure, the vehicle according to the third aspect of the disclosure, the method according to the fourth aspect of the disclosure and the method according to the fifth aspect of the disclosure have identical and similar sub-aspects, as are set out herein. In this respect, for the embodiment of one aspect of the disclosure, reference is also made to the embodiments of the other aspects of the disclosure.

BRIEF DESCRIPTION OF THE DRAWINGS

The invention will now be described with reference to the drawings wherein.

DETAILED DESCRIPTION

Figure 1:
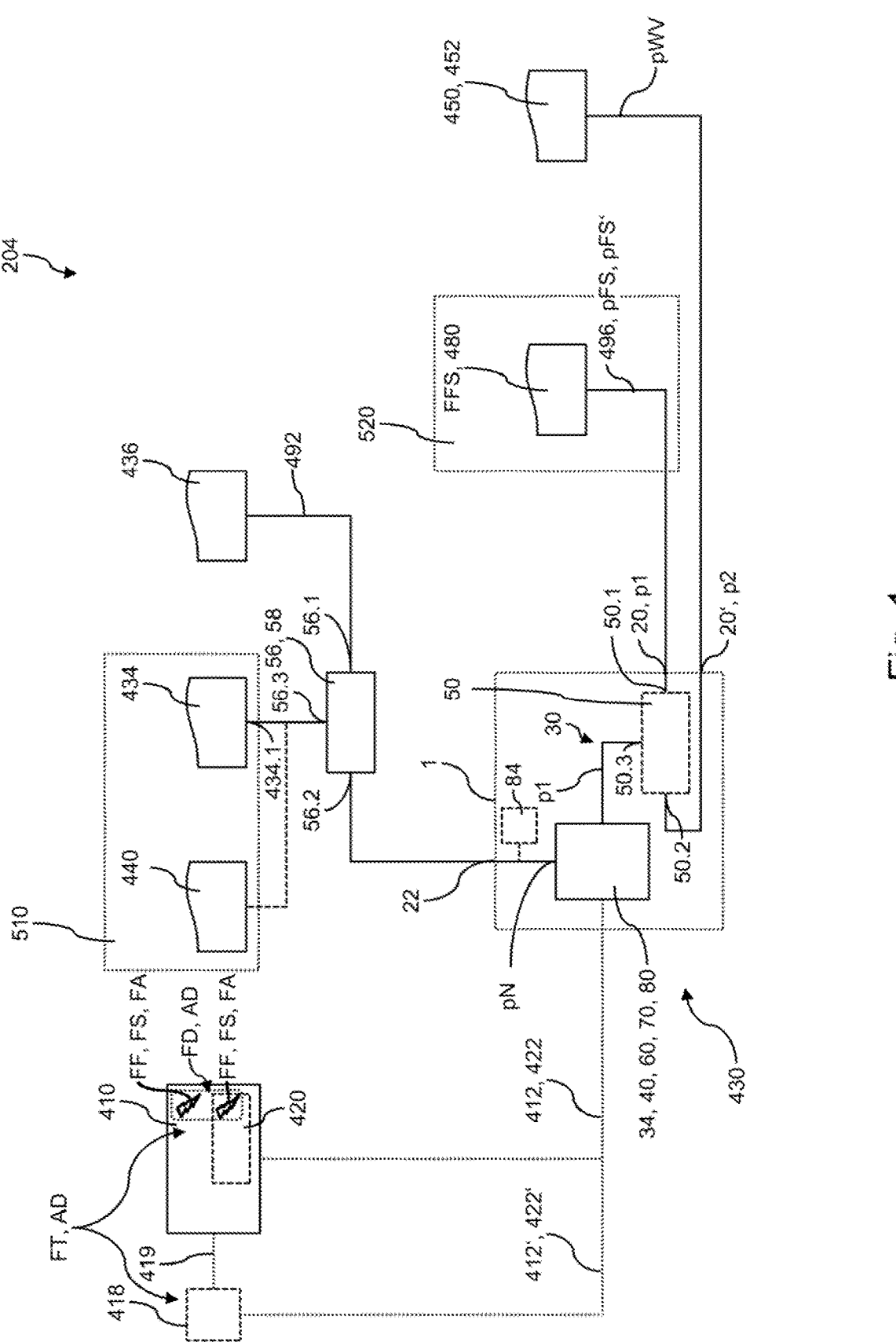
FIG. 1 shows a fail-safety valve unit according to the disclosure.

FIG. 1 shows a fail-safety valve unit 1 according to the disclosure for an electronically controllable pneumatic brake system 204. The fail-safety valve unit 1 has a valve main line 30, which pneumatically connects a main port 20 and a failsafe brake port 22. The fail-safety valve unit 1 has at least one failsafe brake valve 40 which is controllable by a control unit 410 and which, when in the non-actuated, in particular electrically deenergized state, is open in an open position 40A such that a first pressure p1 prevailing at the main port 20 is provided as failsafe brake pressure pN at a failsafe brake port 22. By virtue of the failsafe brake pressure pN being provided at the failsafe brake port 22 when the failsafe brake valve 40 is in the open position 40A, a failsafe braking operation BA of the vehicle 200 can advantageously be initiated via the brake system 204, in particular via the service brake system 510, in a fault event FF, in particular in the event of an exceptional fault FA and/or electrical failure FS, of the control unit 410.

The fail-safety valve unit 1 is advantageously arranged in a separate actuation branch 430 such that the first pressure p1 is provided in particular from a compressed-air reservoir other than the compressed-air reservoir that provides a supply to the front-axle modulator 434 during normal operation.

The main port 20 is advantageously pneumatically connected to the parking brake system 520. In particular, the main port 20 is pneumatically connected to a pneumatic parking brake line 496 of the parking brake system 520 in order to receive a parking brake pressure pFS. Alternatively or in addition, the main port 20 may be configured to receive a pressure pFS' derived from the parking brake pressure pFS.

The fail-safety valve unit 1 may preferably have a selector valve 50, which is configured in particular as a shuttle valve 52. The selector valve 50 is configured to pneumatically connect that one of a first selector valve port 50.1 and a second selector valve port 50.2 at which the higher pressure prevails to a third selector valve port 50.3.

In particular, in embodiments with a selector valve 50, a further reservoir pressure pWV may be provided as second pressure p2 from a further compressed-air source, in particular a further compressed-air reservoir 452 or a yet further compressed-air reservoir 450, via a further main port 20'. Via the selector valve 50, it can advantageously be ensured that either the first pressure p1 from the parking brake system 520, which prevails at the main port 20, or the second pressure p2 prevailing at the further main port 20', is transmitted to the valve main line 30 in accordance with which of the selector valve ports 50.1, 50.2 the higher pressure prevails at. Redundancy is advantageously achieved in this way in the event that no compressed air is available at one of the two selector valve ports, for example owing to a leak or a system failure.

The failsafe brake port 22 is pneumatically connected to a pneumatic front-axle modulator control line 492, preferably via a further selector valve 56, which is configured in particular as a shuttle valve 58. The further selector valve 56 is pneumatically connected, at a first further selector valve port 56.1, via the pneumatic front-axle modulator control line 492 to the brake signal transmitter 436. The further selector valve 56 is pneumatically connected, at a second further selector valve port 56.2, to the at least one failsafe brake valve 40, in particular to the failsafe brake port 22. The further selector valve 56 is configured to connect that selector valve port 56.1, 56.2 at which the higher pressure prevails to a third selector valve port 56.3. The third selector valve 56.3 is pneumatically connected via the failsafe brake valve 40 to the service brake system 510 for the provision of the failsafe brake pressure pN. In particular, the third selector valve port 56.3 is pneumatically connected to the front-axle modulator 434 of the service brake system 510 via a control port 434.1. The control port 434.1 may be formed in particular by a redundancy port 618 of the front-axle modulator 434. In embodiments, the third selector valve port 56.3 may alternatively or additionally be pneumatically connected to a service brake cylinder 440 of the service brake system 510. In embodiments without a further selector valve 56, the failsafe brake port 22 is connected directly to the service brake system 510.

Instead of the front-axle modulator 434 or a brake cylinder 440 of the front axle 210, it is likewise possible in the context of the disclosure for the fail-safety valve unit 1 to be pneumatically connected, for actuation purposes, to other elements of the pneumatic brake system 204, for example to a rear-axle modulator 438 and/or a service brake chamber 444 of a parking brake cylinder 442 or similar brake cylinder. The parking brake cylinder 442 is preferably configured as a spring brake cylinder. In optional embodiments, the brake system 204 and/or the control unit 410 may have a further control unit 420. In particular, the further control unit 420 may be electrically connected to a further energy supply 426 in order to be supplied with electrical energy.

In optional embodiments, the brake system 204 and/or the vehicle 200 may have an external control unit 418, which is connected in a signal-conducting and/or energy-conducting manner to one or more of the valves 40, 60, 70 of the fail-safety valve unit 1, in particular via an alternative control line 412' and an alternative further control line 422'. The external control unit 418 is in particular connected in a signal-conducting manner to the control unit 410, in particular via a monitoring line 419, in order to monitor the control unit. The external control unit 418 may in particular advantageously be formed by another electronic control unit of the vehicle or as part of another electronic control unit of this type. Another electronic control unit of this type, in particular the external control unit 418, may in particular be an automatic operation control unit 464, or an electronic control unit of a steering system, or an electronic control unit of a parking brake system, or an electronic control unit of an air treatment system. An automatic operation control unit 464 may in particular be a so-called virtual driver, which generates driving commands on the basis of sensor data, operating data, route data, setpoint data and similar data, and provides the driving commands to the vehicle. Driving commands may include steering commands, acceleration commands and braking commands, in particular a braking demand AB.

A diagnostic procedure AD for checking the functioning of the fail-safety valve unit 1 may advantageously be carried out in a diagnostic event FT by an electronic control unit, in particular the control unit 410 or an external control unit 418.

In all embodiments, the fail-safety valve unit 1 may optionally have a pressure sensor 84, which is in particular arranged at the failsafe brake port 22 or pneumatically connected thereto, in order to measure the failsafe brake pressure pN. Via a pressure sensor 84, the pressure reaction and thus the functioning of the fail-safety valve unit 1 can be checked for plausibility and/or inspected.

Figures 2A, 2B, 2C, 2D:
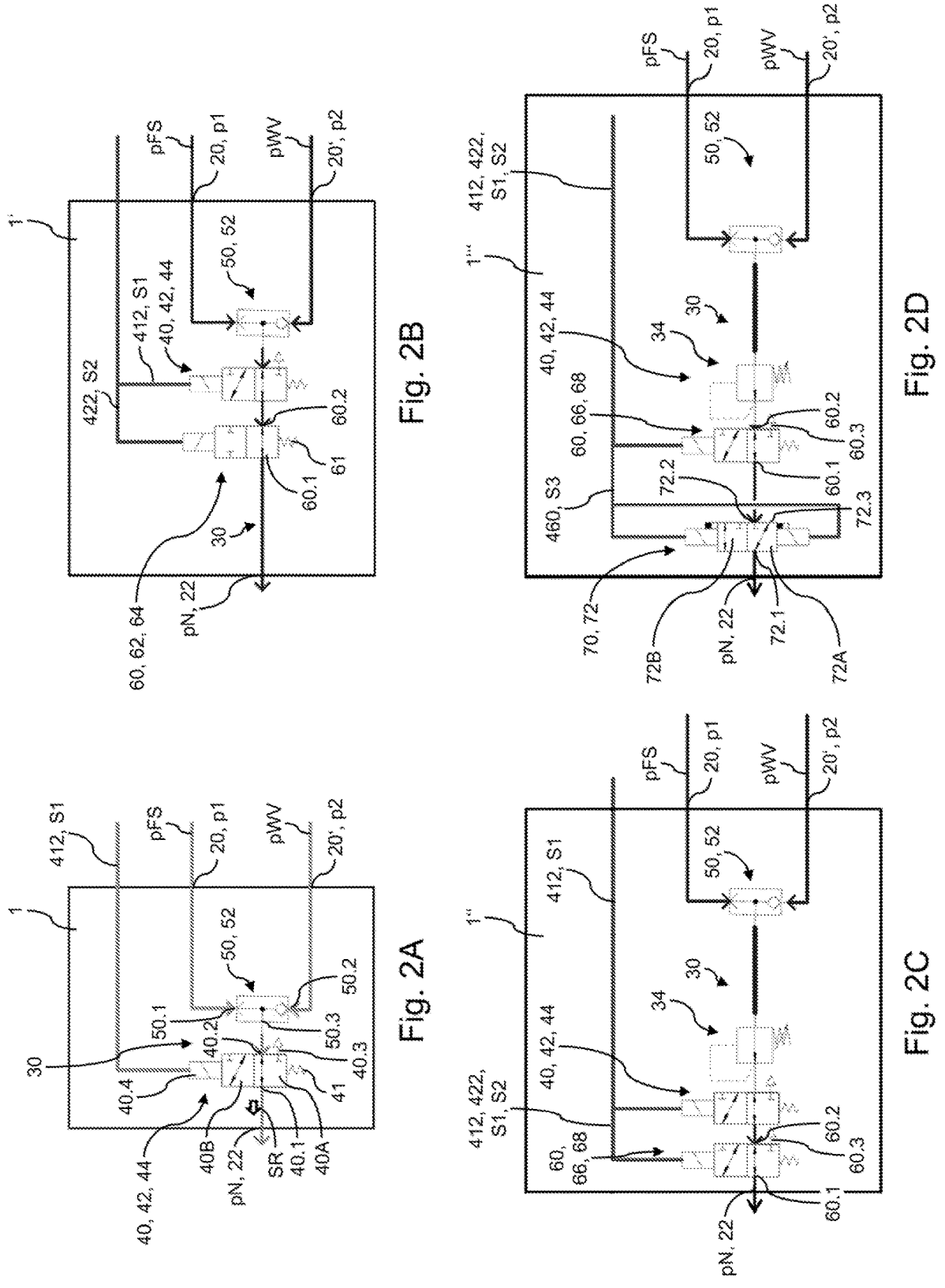
FIG. 2A shows, in detail, the fail-safety valve unit shown in FIG. 1.
FIG. 2B, FIG. 2C, FIG. 2D, FIG. 2E each show a further embodiment of a fail-safety valve unit according to the disclosure.

FIG. 2A shows, in detail, the fail-safety valve unit 1 shown in FIG. 1. The fail-safety valve unit 1 has a monostable failsafe brake valve 40. The failsafe brake valve 40 is connected in a signal-conducting and energy-conducting manner to the control unit 410 via a control line 412.

The failsafe brake valve 40 is illustrated here in a non-actuated and electrically deenergized state, in which it is in an open position 40A. In the open position 40A, a pneumatic connection is produced between a first valve port 40.1 and a second valve port 40.2 of the failsafe brake valve 40. When the failsafe brake valve 40 is in the open position 40A, compressed air can flow in a flow direction SR from the main port 20 to the failsafe brake port 22 for the purposes of providing a failsafe brake pressure pN.

By virtue of a control signal S1 being provided via the control line 412, the failsafe brake valve 40 can be switched from the open position 40A into a shut-off position 40B counter to the resistance of a restoring spring 41. In the shut-off position 40B, a pneumatic connection is produced between the first valve port 40.1 and a ventilation port 40.3.

In particular, provision is made for the failsafe brake valve 40 to be in its shut-off position 40B during normal operation of the vehicle 200. In this state, there is therefore no pneumatic connection between the main port 20 and the failsafe brake port 22, because the pneumatic connection has been shut off at the failsafe brake valve 40.

In a fault event FF, in particular in the absence of a control signal S1, and thus if a magnet part 40.4 of the failsafe brake valve 40 is electrically deenergized, the failsafe brake valve 40 automatically returns to its open position 40A owing to the restoring force generated by the restoring spring 41.

Such a fault event FF may arise for example as a result of an electrical failure FS, if the control unit 410 is not being supplied with energy. In the event of such an electrical failure, it is correspondingly the case that no control signal S1 is transmitted to the failsafe brake valve 40.

Furthermore, a fault event FF may also consist in an exceptional fault FA occurring in the control unit 410, and a zero signal being output by the control unit 410 as a fault measure (in particular in the absence of other program alternatives), and the control signal S1 thus being intentionally set to 0 in order to switch the failsafe brake valve 40 into the open position 40A.

A diagnostic event FT may be initiated, preferably by the control unit, in order to check the functioning of the fail-safety valve unit. The diagnostic event FT may be initiated as part of a diagnostic procedure. In particular, in a diagnostic event FT, an actuation of the failsafe brake valves is interrupted by virtue of the provision of the signal S1, S2 being ended.

FIG. 2B shows a further preferred embodiment of a fail-safety valve unit 1' according to the disclosure. By contrast to the embodiments shown in FIG. 2A, the fail-safety valve unit 1' shown here has a further failsafe brake valve 60, which is arranged in the valve main line 30 and which is connected pneumatically in series with the failsafe brake valve 40. The further failsafe brake valve 60 is configured here as a 2/2 directional valve 62, in particular as a 2/2 directional solenoid valve 64.

In other embodiments, the further failsafe brake valve 60 may likewise be configured as a 3/2 directional valve 66, in particular as a 3/2 directional solenoid valve 68, as shown by way of example in FIG. 2C. The further failsafe brake valve 60 is in particular of monostable configuration, such that it is in a further open position 60A when in the non-actuated, in particular electrically energized state. In particular, the further failsafe brake valve 60 has a further restoring spring 61, which moves the further failsafe brake valve 60, when in the non-actuated state, into the further open position 60A. In the further open position 60A, a first further valve port 60.1 of the further failsafe brake valve 60 is pneumatically connected to a second further valve port 60.2 of the further failsafe brake valve 60. The further failsafe brake valve 60 is in particular actuated by way of a further control signal S2 via a further control line 422, in particular from the control unit 410 or a further control unit 420.

An embodiment with a further failsafe brake valve 60 is advantageous in particular in the case of an optional brake system 204 that has a further control unit 420 or similar redundant control device. In particular, in such a brake system 204, the control unit 410 is assigned to a primary system B1, and the further control unit 420 is assigned to a first fall-back level B2. In a fault event FF in the primary system B1, in particular in the control unit 410, it thus remains possible, via the still-intact fall-back level B2, for the fail-safety valve unit 1' to be actuated, and in particular for a provision of the failsafe brake pressure pN to be withheld by way of sustained actuation of the further failsafe brake valve 60 in the further shut-off position 60B. Via a further failsafe brake valve 60 configured as a 2/2 directional solenoid valve 64, it is possible in particular for the failsafe brake pressure pN to be modulated. In this way, staged braking is advantageously made possible, in particular via a redundancy port 618, even in the event of a partial failure, in particular if a primary system B1 has failed, and brake functionality is advantageously ensured by the fail-safety valve unit 1 by way of the separate actuation branch.

In the event of a double fault FD, that is, if a fault event FF, in particular in the form of an exceptional fault FA and/or an electrical failure FS, occurs both in the control unit 410 and in the further control unit 420, both the failsafe brake valve 40 and the further failsafe brake valve 60, owing to their monostable behavior, switch into their respective open position 40A, 60A in order to provide a failsafe brake pressure pN at the failsafe brake port 22.

FIG. 2C illustrates a yet further preferred embodiment of a fail-safety valve unit 1". By contrast to the embodiment shown in FIG. 2B, the further failsafe brake valve 60 is configured in the present case as a 3/2 directional valve 66, in particular as a 3/2 directional solenoid valve 68. In particular, the failsafe brake valve 40 and the further failsafe brake valve 60 are advantageously structurally identical. In particular, the further failsafe brake valve 60 configured as a 3/2 directional valve 66 has a further ventilation port 60.3, which in the shut-off position 60B is connected to the first further valve port 60.1. Via the further ventilation port 60.3, the failsafe brake port 22 can advantageously be ventilated when the further failsafe brake valve 60 has been switched into its shut-off position 60B.

It is advantageously possible in all embodiments for a pressure-limiting valve 34 to be arranged in the valve main line 30, as illustrated in FIG. 2C. A pressure-limiting valve 34 can be used to set a predefined air pressure with which the failsafe brake pressure pN is provided at the failsafe brake port 22, in order to achieve a suitable braking action for the vehicle during the failsafe braking operation.

In embodiments, the further failsafe brake valve 60 is in particular likewise actuated jointly with the failsafe brake valve 40 by way of the control signal S1. In particular, the further failsafe brake valve 60 is actuated jointly with the failsafe brake valve 40 via the control line 412, in particular is actuated jointly with the failsafe brake valve 40 from the control unit 410. An arrangement of multiple failsafe brake valves 40, 60, in particular an arrangement with a failsafe brake valve 40 and a further failsafe brake valve 60, has the advantage of redundancy in the event of a valve fault, in particular in the event of a mechanical or electrical valve fault, at one of the failsafe brake valves 40, 60. For example, if one of the failsafe brake valves 40, 60 can no longer be actuated, and moved from the open position 40A, 60A into the shut-off position 40B, 60B, owing to jamming or a defective magnet part, the vehicle would inadvertently assume a state of a failsafe braking operation BA induced by the fail-safety valve unit 1". This unintended state can be eliminated and/or prevented via the further, still-functioning failsafe brake valve.

FIG. 2D illustrates a yet further preferred embodiment of a fail-safety valve unit 1''' with a bistable valve 72. It is advantageously possible in all embodiments for a bistable valve 72 to be arranged in the valve main line 30, as illustrated in FIG. 2C.

In particular, the bistable valve 72 is connected in a signal-conducting and/or energy-conducting manner to a controller, in particular the control unit 410 or a further control unit 420 or a yet further control unit that is not shown here, via a yet further control line 460, and is controllable by way of a third control signal S3. The bistable valve 72 has the characteristic of not being directly influenced by a fault event FF because, owing to its bistable characteristic, it remains in a position into which it has previously been switched.

By contrast, the failsafe brake valve 40 and the further failsafe brake valve 60, owing to their monostable behavior, have the characteristic of returning into one position, in the present case into the respective open position 40A, 60A, in an electrically deenergized state. In this way, according to the disclosure, automatic switching of the failsafe brake valves 40, 60 into their open position 40A, 60A can be achieved in a situation in which no control signal S1, S2 is present, or the control signal S1, S2 is present as a zero signal, at the failsafe brake valve 40 and in particular also at the further failsafe brake valve 60. Such a situation with an absence of a control signal S1, S2, or with a zero signal, arises in particular in the event of an exceptional fault FA or electrical failure FS in the control units 410, 420.

When the bistable valve 72 is situated in its second position 72B, this is suitable in particular for automatic, in particular autonomous driving operation of the vehicle 200, because in this case, a pneumatic connection is produced between a first and a second bistable valve port 72.1, 72.2, and in this way, in the case of the failsafe brake valves 40, 60 returning to their open position 40A, 60A, a failsafe brake pressure pN is provided at the failsafe brake port 22 for the purposes of braking the vehicle 200. In an automatic, in particular autonomous driving mode, the vehicle 200 may be controlled for example via an automatic operation control unit 464, which is connected in a signal-conducting manner to the vehicle data bus 462.

When the bistable valve 72 is situated in its first position 72A, this is suitable in particular for a manual driving mode of the vehicle 200. In this case, a shut-off of the valve main line 30 prevents a failsafe braking operation from being performed, as a result of a failsafe brake pressure pN being provided at the failsafe brake port 22, in a fault event FF, in particular in the event of a double fault FD.

Figure 2E:
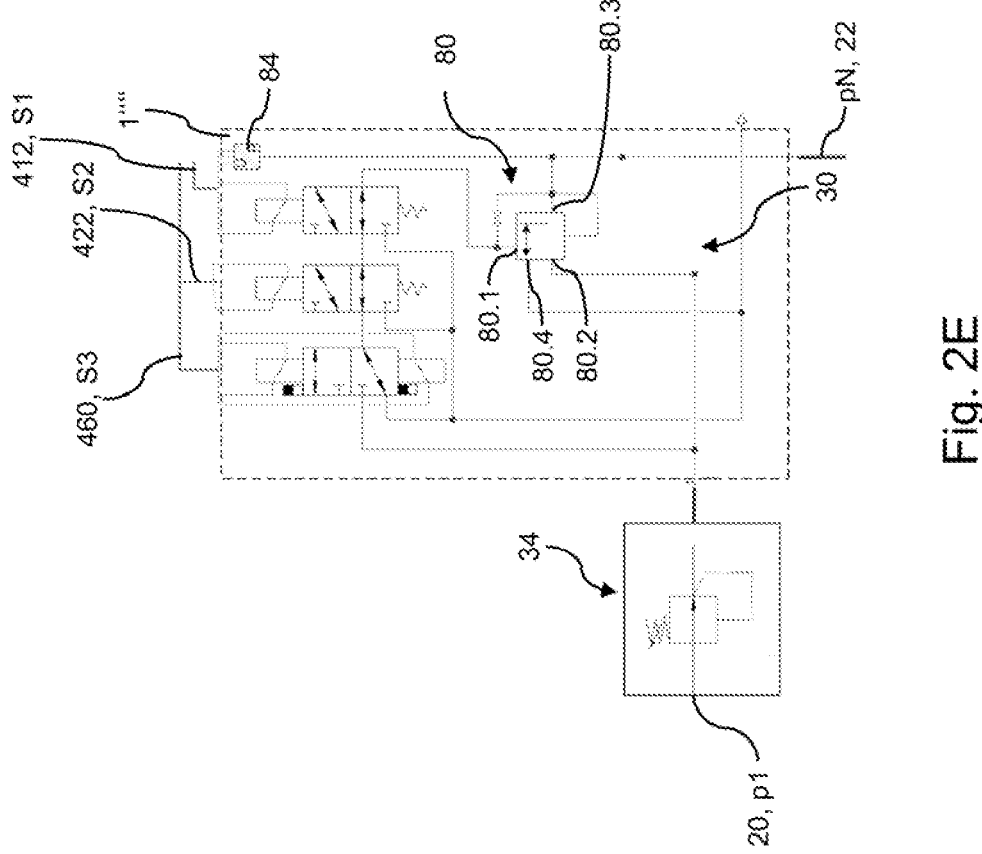

FIG. 2E illustrates a yet further preferred embodiment of a fail-safety valve unit 1"" with a pressure sensor 84. In the present case, the pressure sensor 84 is arranged at the failsafe brake port 22 and is configured to measure the provided failsafe brake pressure pN. Via a pressure sensor 84, the pressure reaction and thus the functioning of the fail-safety valve unit 1 can be checked for plausibility and/or inspected.

In all embodiments, a failsafe relay valve 80 may also be provided. The failsafe relay valve 80 has a failsafe control port 80.1, a failsafe reservoir port 80.2, a failsafe working port 80.3 and a failsafe ventilation port 80.4. The failsafe reservoir port 80.2 is pneumatically connected to the main port 20. The failsafe control port 80.1 is connected to the valve main line 30 such that the valve main line including all failsafe brake valves 40, 60 and any bistable valves 72 form the control line of the failsafe relay valve 80. The failsafe working port 80.3 is pneumatically connected to the failsafe brake port 22. The failsafe relay valve 80 has the effect of boosting an air flow rate, whereby the air flow rates that have to be switched by the failsafe brake valves and optionally by the bistable valve are advantageously lower, and the valves can therefore be dimensioned to be smaller, and/or are subjected to lower load.

Figure 3:
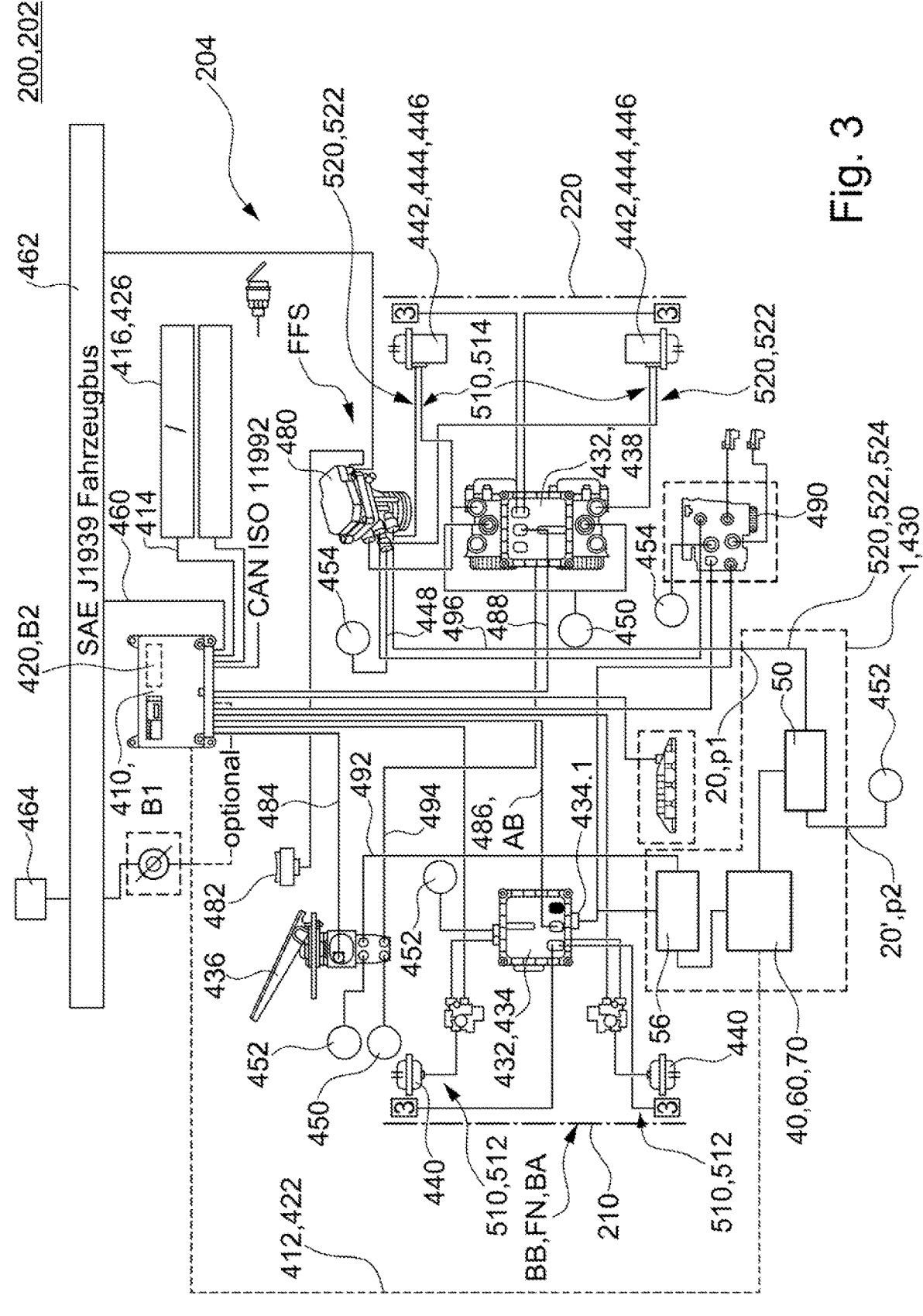
FIG. 3 shows an electronically controllable pneumatic brake system having a fail-safety valve unit according to the disclosure; and, FIG. 4 shows a pneumatic circuit diagram of an axle modulator for an electronically controllable pneumatic brake system.

FIG. 3 shows an electronically controllable pneumatic brake system 204 with a fail-safety valve unit 1 for a failsafe brake function FN according to the disclosure. The electronically controllable pneumatic brake system 204 is used in the present case in a vehicle 200 configured as a utility vehicle 202, which is illustrated here in highly schematic form, in particular with an indicated front axle 210 and an indicated rear axle 220.

The electronically controllable pneumatic brake system 204 is controlled via a control unit 410. The control unit 410 is connected in an energy-conducting manner to an energy supply 416 via a supply line 414.

In order to receive brake signals, the control unit 410 is electrically connected in a signal-conducting manner to a brake signal transmitter 436 via a brake signal transmitter control line 484. The control unit 410 is furthermore configured to actuate a front-axle modulator 434, via an electrical signal-transmitting front-axle modulator control line 486, in a manner dependent on the brake signals or in a manner dependent on any driving programs of an automatic operation control unit 464 in an automatic driving mode. In particular, a braking operation can be initiated via the front-axle modulator control line 486 by an electrical or electronic braking demand AB placed on the axle modulator 432. An electronic braking demand AB may in particular be in the form of a CAN and/or XBR signal. The front-axle modulator 434 is configured to supply compressed air from a further compressed-air reservoir 452 to a pneumatic front-axle brake circuit 512 of a service brake system 510 of the electronically controllable pneumatic brake system 204 in a manner dependent on this actuation, in order to actuate at least one service brake cylinder 440, which is assigned to a front wheel 212, to perform a service braking operation BB. The control unit 410 is furthermore configured to actuate in each case one service brake chamber 444 of at least one parking brake cylinder 442, which is assigned to a rear wheel 222, via a pneumatic rear-axle brake circuit 514 by way of pneumatic actuation. The control unit 410 is electrically connected in a signal-conducting manner to a rear-axle modulator 438 via a rear-axle modulator control line 488. The compressed air for the pneumatic rear-axle brake circuit 514 is provided here from a yet further compressed-air reservoir 450 and is conducted via the rear-axle modulator 438, when actuated by the control unit 410, to the service brake chambers 444. The control unit 410 is thus configured to brake both the front wheels 212 and the rear wheels 222 of the vehicle 200. The front-axle modulator control line 486 and/or the rear-axle modulator control line 488 are configured in particular as vehicle data bus lines, in particular CAN lines.

The brake system 204 has a parking brake function FFS with a parking brake module 480. The parking brake function FFS can preferably be implemented via a parking brake system 520 and/or the parking brake module 480. Via the parking brake function FFS, a parking brake pressure pFS can be output in order to pressurize parking brake cylinders 442. Accordingly, the parking brake function FFS preferably includes a parking brake module 480. The parking brake module 480 of the brake system 204 is configured to actuate a parking brake chamber 446 of one of the two parking brake cylinders 442, which are each assigned to the rear wheel 222, via a pneumatic rear-axle brake circuit 522 of the parking brake system 520, in particular via a pneumatic parking brake line 496, by way of an output parking brake pressure pFS. The parking brake module 480 is electrically connected in a signal-conducting manner to a parking brake operator control element 482. The pneumatic rear-axle brake circuit 522 of the parking brake system 520 can thus be activated and deactivated via the parking brake operator control element 482. The parking brake module 480 is pneumatically connected via a reservoir line 448 to the compressed-air reservoir 454 in order to be supplied with compressed air.

The rear-axle modulator 438 is connected in a signal-conducting manner to the control unit 410 via the rear-axle modulator control line 488. Here, the compressed air for the parking brake system 520 is provided from a compressed-air reservoir 454.

The brake signal transmitter 436 is pneumatically connected via a pneumatic front-axle modulator control line 492 to a pneumatic control port 434.1, in particular a redundancy port 618, of the front-axle modulator 434 in order to actuate the pneumatic front-axle brake circuit 512. The front-axle modulator 434 is in particular configured such that, when pneumatically pressurized via the front-axle modulator control line 492, it outputs a brake pressure to the service brake cylinders 440. The brake signal transmitter 436 is—analogously to the front-axle modulator 434—pneumatically connected via a pneumatic rear-axle modulator control line 494 to the rear-axle modulator 438 in order to actuate the pneumatic rear-axle brake circuit 514. The rear-axle modulator 438 is in particular configured such that, when pneumatically pressurized via the front-axle modulator control line 494, it outputs a brake pressure to the service brake cylinders 444. In particular, the front-axle modulator 434 and/or the rear-axle modulator 438 have a relay valve 602 for outputting a brake pressure.

The main port 20 of the fail-safety valve unit 1 is pneumatically connected via the pneumatic parking brake line 496 to the parking brake module 480 and to the pneumatic rear-axle brake circuit 522 of the parking brake system 520. A further selector valve 56 is advantageously arranged in the pneumatic front-axle modulator control line 492 in order to pneumatically connect the failsafe brake port 22 to a control inlet of the front-axle modulator 434.

The failsafe brake valve 40 is connected in a signal-conducting and energy-conducting manner to the control unit 410 via a control line 412. The vehicle 200 may have a further pressure control device 489, in this case in the form of a trailer control module 490 for providing a pneumatic supply to a trailer (not illustrated here) of the vehicle 200.

When a failsafe brake pressure pN is provided at the failsafe brake port 22, the failsafe brake pressure pN passes to the front-axle modulator 434, whereby the front-axle modulator 434 pneumatically actuates two service brake cylinders 440 that are each assigned to the front axle 210. The service brake cylinders 440 are thus actuated by virtue of the failsafe brake pressure pN being applied to the front-axle modulator 434, whereby a failsafe braking operation BA of the front axle 210 and thus of the vehicle 200 is achieved. The fail-safety valve unit 1 is arranged in a separate actuation branch 430 of the electronically controllable pneumatic brake system 204, which is provided independently of the regular actuation of the service brake cylinders 440, in particular via a brake signal transmitter 436. It is nevertheless also possible in the context of the disclosure for a failsafe brake pressure pN to be provided directly to at least one service brake cylinder 440, or for another brake cylinder, for example to the service brake chamber 444 of the parking brake cylinders 442 assigned to the rear wheels 222. In particular, in order to increase the independence of the fail-safety valve unit 1 and thus advantageously provide a redundant failsafe brake functionality, the compressed-air reservoir 454 that provides a supply to the parking brake module 480 is separate from a further compressed-air reservoir 452 that provides compressed air for the service brake cylinders 440 during normal operation.

Figure 4:
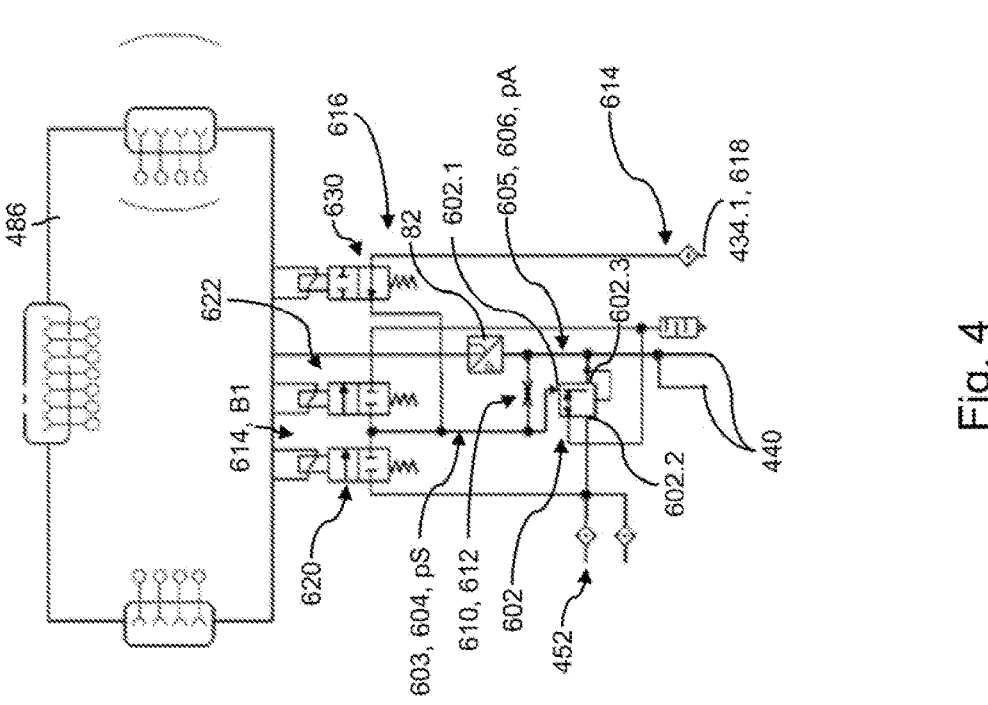

FIG. 4 shows a pneumatic circuit diagram of an axle modulator 432, in particular of a front-axle modulator 434. The axle modulator 432 has a relay valve 602, to which a control pressure can be applied via a control line at 604 and a valve control port 602.1 in order to output a working pressure at a working port 602.3. Compressed air is provided to the relay valve 602, in particular from a further compressed-air reservoir 452, via a reservoir port 602.2. The working port 602.3 is in particular pneumatically connected to the service brake cylinders 440 of the front axle 210 via a working line 606. The control line 604 has an electrical actuation branch 614 with a first actuation valve 620 and a second actuation valve 622, which is configured to pressurize and/or ventilate the valve control port 602.1. The electrical actuation branch 614 with the actuation valves 620, 622 is controllable in particular via the control unit 410 and/or the primary system B1, in particular via the front-axle modulator control line 486. The control line 604 has a pneumatic actuation branch 616 with a backup valve 630. The valve control port 602.1 is pneumatically connected via the pneumatic actuation branch 616 to a control port 434.1. The control port 434.1 is configured in particular as a redundancy port 618 of the front-axle modulator 434. The backup valve 630 is configured in particular as a 2/2 directional valve and to be of monostable, normally-open configuration so as to open, and allow pneumatic actuation via the pneumatic actuation branch 616, in the absence of actuation in a fault event FF. The actuation valves 620, 622 of the electrical actuation branch 614 are in particular configured correspondingly as 2/2 directional valves and to be of monostable, normally-closed configuration. The axle modulator 432 has an axle modulator pressure sensor 82, which in this case is arranged in the working line 606 in order to measure the working pressure pA.

The front-axle modulator 434 advantageously has a throttle 610, in particular a dissipation bore 612, which pneumatically connects the working line 606 to the control line 604. The throttle 610 has a reduced nominal diameter in relation to the control line 604 and/or the working line 606.

The throttle 610 is in particular arranged in a relay piston of the relay valve 602, in particular as a dissipation bore 612 in the relay piston. Using a throttle, it can advantageously be ensured that, irrespective of any bleed-back function that may be available, and/or leaks or a loss of pressure at the front-axle brake circuit, the parking brake is automatically ventilated and thus a safe state of the vehicle can be permanently ensured by virtue of the vehicle being at a standstill. Via such a throttle, the engagement of the parking brake cylinders 442 can advantageously be ensured even in the event of a leak in a working line 606 or in a part that is pneumatically connected to the working line 606. Via such a throttle, a pneumatic connection is created between that part of the axle modulator 432 which conducts working pressure, in particular the working line 606, and that part of the axle modulator 432 which conducts control pressure, in particular the control line 604. A leak in a part 605 that conducts a working pressure pA thus leads to a pressure drop in a part 603 that conducts a control pressure pS, and in that case to an engagement of the parking brake owing to the pneumatic connection between the part that conducts the control pressure and the fail-safety valve unit according to the disclosure. In particular, the throttle is provided in a relay piston of the relay valve 602 of the axle modulator 432.

The statements made here with regard to the front-axle modulator 434 may equally also apply, in other embodiments of the disclosure, to another axle modulator 432, for example a rear-axle modulator 438.

It is understood that the foregoing description is that of the preferred embodiments of the invention and that various changes and modifications may be made thereto without departing from the spirit and scope of the invention as defined in the appended claims.

1, 1', 1", 1"', 1"" Fail-safety valve unit
20 Main port
22 Failsafe brake port
30 Valve main line
34 Pressure-limiting valve
40 Monostable failsafe brake valve
40.1 First valve port of the failsafe brake valve
40.2 Second valve port of the failsafe brake valve
40.3 Ventilation port of the failsafe brake valve
40.4 First magnet part, magnet part of the failsafe brake valve
40A Open position of the failsafe brake valve, open position
40B Shut-off position of the failsafe brake valve, shut-off position
41 Restoring spring, restoring spring of the failsafe brake valve
50 Selector valve
50.1 First port of the selector valve
50.2 Second port of the selector valve 50.3 Third port of the selector valve
52 Shuttle valve, select-high shuttle valve
56 Further selector valve
56.1 First port of the further selector valve
56.2 Second port of the further selector valve
56.3 Third port of the further selector valve
58 Further shuttle valve, further select-high shuttle valve
60 Further monostable failsafe brake valve
60.1 First valve port of the further failsafe brake valve
60.2 Second valve port of the further failsafe brake valve
60.3 Ventilation port of the further failsafe brake valve
60.4 Further magnet part, magnet part of the further failsafe brake valve
60A Open position of the further failsafe brake valve, further open position
60B Shut-off position of the further failsafe brake valve, further shut-off position
61 Further restoring spring, restoring spring of the further failsafe brake valve
70 Bistable valve unit
72 Bistable valve
72.1 First bistable valve port
72.2 Second bistable valve port
72.3 Vent of the bistable valve
72A First position of the bistable valve
72B Second position of the bistable valve
80 Failsafe relay valve
80.1 Failsafe control port
80.2 Failsafe reservoir port
80.3 Failsafe working port
80.4 Failsafe ventilation port
82 Axle modulator pressure sensor
84 Pressure sensor
200 Vehicle
202 Utility vehicle
204 Brake system, electronically controllable pneumatic brake system
210 Front axle
220 Rear axle
410 Control unit
412 Control line
412' Alternative control line
414 Supply line
416 Energy supply
418 External control unit
419 Monitoring line
420 Further control unit
422 Further control line
422' Alternative further control line
426 Further energy supply
430 Separate actuation branch
432 Axle modulator
434 Front-axle modulator
436 Brake signal transmitter
438 Rear-axle modulator
440 Service brake cylinder
442 Parking brake cylinder
444 Service brake chamber of the parking brake cylinder
446 Parking brake chamber of the parking brake cylinder
448 Reservoir line, parking brake system reservoir line
450 Yet further compressed-air reservoir
452 Further compressed-air reservoir
454 Compressed-air reservoir
460 Yet further control line, vehicle data bus line
462 Vehicle data bus
464 Automatic operation control unit
480 Parking brake module 482 Parking brake operator control element
484 Electrical brake signal transmitter control line
486 Electrical front-axle modulator control line
488 Electrical rear-axle modulator control line
489 Pressure control device
490 Trailer control module
492 Pneumatic front-axle modulator control line
494 Pneumatic rear-axle modulator control line
496 Pneumatic parking brake line
510 Service brake system
512 Pneumatic front-axle brake circuit of the service brake system
514 Pneumatic rear-axle brake circuit of the service brake system
516 Redundancy circuit of the service brake system
520 Parking brake system
522 Pneumatic rear-axle brake circuit of the parking brake system
524 Bypass supply branch of the parking brake system
602 Relay valve
602.1 Valve control port of the relay valve
602.2 Reservoir port of the relay valve
602.3 Working port of the relay valve
603 Part which conducts control pressure
604 Control line
605 Part which conducts working pressure
606 Working line
610 Throttle
612 Dissipation bore
614 Electrical actuation branch
616 Pneumatic actuation branch
618 Redundancy port
620 First actuation valve
622 Second actuation valve
630 Backup valve
AB Braking demand
AD Diagnostic procedure
B1 Primary system
B2 First fall-back level
BA Failsafe braking operation
BB Service braking operation
FA Exceptional fault
FD Double fault
FF Fault event
FFS Parking brake function
FN Failsafe brake function
FS Electrical failure
FT Diagnostic event
First pressure
p2 Second pressure
pA Working pressure
pB Limiting pressure
pE Set pressure
pFS Parking brake pressure
pFS' Pressure derived from the parking brake pressure
pN Failsafe brake pressure
pS Control pressure
pWV Further reservoir pressure
S1 First control signal
S2 Second control signal
S3 Third control signal
SR Flow direction

The invention claimed is:
1. A fail-safety valve unit for a failsafe brake function of an electronically controllable pneumatic brake system for a vehicle, the electronically controllable pneumatic brake system having at least one control unit, the fail-safety valve unit comprising:

a main port configured to provide a first pressure;

a failsafe brake port;

a failsafe brake valve configured as a monostable valve, said failsafe brake valve being controllable by the control unit or by an external control unit;

said failsafe brake valve being configured to pneumatically connect said main port and said failsafe brake port when in an open position to output a failsafe brake pressure at said failsafe brake port;

wherein, in an event of at least one of a fault event, an electrical failure, and a diagnostic event of the control unit, said failsafe brake valve is configured to be in the open position and a failsafe braking operation of the vehicle is initiated through a provision of the failsafe brake pressure at said failsafe brake port by the brake system; and, said main port being pneumatically connected to a parking brake function to receive an output parking brake pressure as the first pressure.

2. The fail-safety valve unit of claim 1, wherein:

said fail-safety valve unit includes a selector valve having a first port pneumatically connected to the parking brake function in order to receive the first pressure;

said selector valve has a second port pneumatically connected to a compressed-air reservoir in order to receive a reservoir pressure as a second pressure;

said selector valve has a third port pneumatically connected to said failsafe brake valve; and, said selector valve is configured to pneumatically connect said first port to said third port when the first pressure is higher than the second pressure and to pneumatically connect said second port to said third port when the second pressure is higher than the first pressure.

3. The fail-safety valve unit of claim 1, wherein:

the failsafe brake pressure is provided as control pressure for an axle modulator; or, the failsafe brake pressure is provided as brake pressure for a brake cylinder.

4. The fail-safety valve unit of claim 1 further comprising:

a further failsafe brake valve connected pneumatically in series with said failsafe brake valve;

said further failsafe brake valve being configured to be controlled by at least one of the control unit, a further control unit or the external control unit; and, said further failsafe brake valve, when in a non-actuated state, being open in an open position such that the first pressure prevailing at said main port is provided as the failsafe brake pressure at said failsafe brake port.

5. The fail-safety valve unit of claim 4, wherein said further failsafe brake valve is configured as at least one of a 2/2 directional valve and a 2/2 directional solenoid valve.

6. The fail-safety valve unit of claim 4, wherein at least one of said failsafe brake valve and said further failsafe brake valve is configured as a 3/2 directional valve.

7. The fail-safety valve unit of claim 1 further comprising a pressure-limiting valve.

8. The fail-safety valve unit of claim 1 further comprising:

a bistable valve configured for switching between a first, deactivation position, which shuts off a valve main line of the fail-safety valve unit or connects said valve main line to a vent, and a second, activation position, which connects said valve main line; and, wherein said bistable valve is connected pneumatically in series with said at least one failsafe brake valve.

9. The fail-safety valve unit of claim 2 further comprising:

a further selector valve having a first further port, said first further port being pneumatically connected to a brake signal transmitter in order to receive a brake signal transmitter pressure;

said further selector valve having a second further port, said second further port being pneumatically connected to said failsafe brake port in order to receive the failsafe brake pressure;

said further selector valve having a third further port, said third further port being pneumatically connected to a service brake cylinder or to an axle modulator; and, said further selector valve being configured to pneumatically connect that one of said first further port and said second further port at which a higher pressure prevails to said third further port.

10. An electronically controllable pneumatic brake system for a vehicle having a control unit, the electronically controllable pneumatic brake system comprising:

a fail-safety valve unit for a failsafe brake function of the electronically controllable pneumatic brake system;

said fail-safety valve unit having a main port configured to provide a first pressure and a failsafe brake port;

said fail-safety valve unit further having a failsafe brake valve configured as a monostable valve, said failsafe brake valve being controllable by the control unit or by an external control unit;

said failsafe brake valve being configured to pneumatically connect said main port and said failsafe brake port when in an open position to output a failsafe brake pressure at said failsafe brake port;

wherein, in an event of at least one of a fault event, an electrical failure, and a diagnostic event of the control unit, said failsafe brake valve is configured to be in the open position and a failsafe braking operation of the vehicle is initiated through a provision of the failsafe brake pressure at said failsafe brake port by the brake system;

said main port being pneumatically connected to a parking brake function in order to receive an output parking brake pressure as said first pressure; and, said fail-safety valve unit being arranged in a separate actuation branch and being pneumatically connectable via said failsafe brake port to at least one of a service brake cylinder, a service brake chamber, and an axle modulator in order to provide the failsafe brake pressure for said axle modulator in order to initiate the failsafe braking operation of the vehicle.

11. The electronically controllable pneumatic brake system of claim 10, wherein said axle modulator with a throttle pneumatically connects a first part, which conducts a control pressure, of said axle modulator to a second part, which conducts a working pressure, of said axle modulator.

12. The electronically controllable pneumatic brake system of claim 10, wherein said axle modulator with a dissipation bore pneumatically connects a first part, which conducts a control pressure, of said axle modulator to a second part, which conducts a working pressure, of said axle modulator.

13. The electronically controllable pneumatic brake system of claim 10, wherein the control unit is assigned to a primary system of the electronically controllable pneumatic brake system, and the electronically controllable pneumatic brake system further comprises:

a further control unit for a first fall-back level;

said failsafe brake valve being actuatable by the control unit, and a further failsafe brake valve being actuatable by said further control unit; and, said control unit and said further control unit being supplied with energy independently of one another and/or being able to at least partially replace one another in terms of function.

14. A vehicle comprising the electronically controllable brake system of claim 10.

15. A method for operating a brake system having a fail-safety valve unit for a failsafe brake function of an electronically controllable pneumatic brake system for a vehicle, the method comprising:

providing a signal for locking out a failsafe brake pressure, which takes effect for a failsafe braking operation, via a control unit or an external control unit;

interrupting said providing the signal in at least one of an event of a fault event, an electrical failure, and a diagnostic event of the control unit and thus automatically ending the lock-out of the failsafe brake pressure to initiate the failsafe braking operation of the vehicle; and, wherein the failsafe brake pressure is a parking brake pressure output by a parking brake function for pressurizing parking brake cylinders.

16. The method of claim 15, further comprising a diagnostic procedure including:

ascertaining the failsafe brake pressure at a failsafe brake port, wherein, before said interruption of said providing of the signal, a demand is made for pressure to be output in the service brake system.

17. The method of claim 16, wherein the demand is a braking demand placed on an axle modulator.

18. A method for operating a brake system with a fail-safety valve unit for a failsafe brake function of an electronically controllable pneumatic brake system for a vehicle or a utility vehicle, the method comprising:

providing a signal for locking out a failsafe brake pressure, which takes effect for a failsafe braking operation, via a control unit or an external control unit;

interrupting said providing of the signal in at least one of a fault event, an event of an electrical failure, and a diagnostic event of the control unit and thus automatically ending the lock-out of the failsafe brake pressure to initiate the failsafe braking operation of the vehicle, wherein the failsafe braking operation has a diagnostic procedure including:

ascertaining the failsafe brake pressure at a failsafe brake port; and, wherein, before said interrupting said providing of the signal, a demand is made for pressure to be output in a service brake system.

19. The method of claim 18, wherein the demand is a braking demand placed on an axle modulator.

20. The method of claim 18, wherein a pneumatic supply is provided to the fail-safety valve unit from a further brake circuit that is independent of a brake circuit of the service brake system which performs the failsafe braking operation.

21. The method of claim 18, wherein a pneumatic supply is provided to the fail-safety valve unit from a further pressure reservoir that is independent of a pressure reservoir of that brake circuit of the service brake system which performs the failsafe braking operation.

22. The method of claim 18, wherein:

the diagnostic procedure is performed during a service braking operation of the service brake system, in particular while a braking demand is present, or the diagnostic procedure is performed while the vehicle is at a standstill.

23. The method of claim 18, wherein:

the diagnostic procedure is performed during a service braking operation of the service brake system, in particular while a braking demand is present, or the diagnostic procedure is performed while the vehicle is at a standstill, wherein the braking demand is generated.

24. The method of claim 18, wherein:

the braking demand is provided by at least one of a brake signal transmitter, an external control unit, and an automatic operation control unit; and, wherein at least one of: the braking demand is provided via a vehicle data bus and the braking demand is in the form of a CAN signal.

25. The method of claim 18 further comprising:

providing a signal for an individual valve; and, ascertaining the failsafe brake pressure.

26. The method of claim 25 further comprising checking a plausibility of a pressure reaction for the individual valve.

* * * * *